H. P. JENSEN-BEÄRLUNDD.
AUTOMATIC CLUTCH.
APPLICATION FILED JULY 2, 1919.
1,380,306.
Patented May 31, 1921.
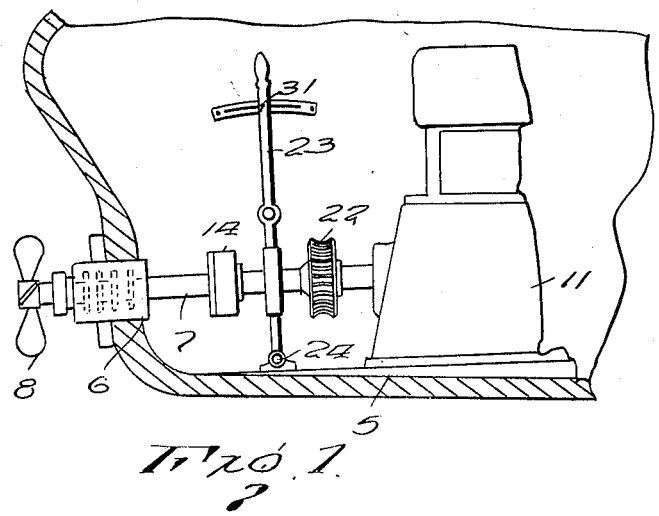
Fig. 1.
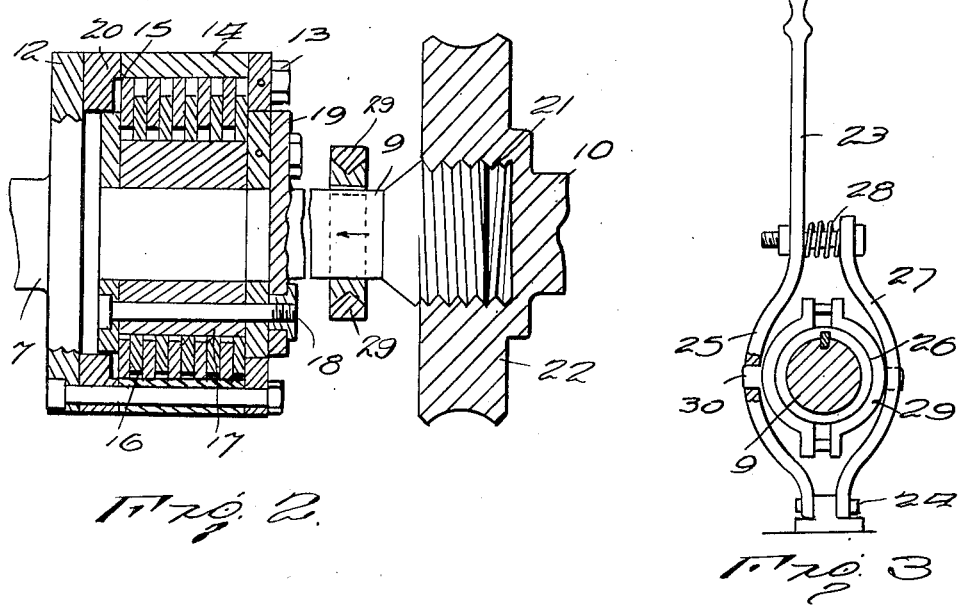
Fig. 2.
Fig. 3.
Hans P. Jensen-Bearlundd
Inventor
By Geo. P. Kimmel
Attorney

UNITED STATES PATENT OFFICE.

HANS P. JENSEN-BEÄRLUNDD, OF LISBON, PORTUGAL.

AUTOMATIC CLUTCH.

1,380,306.   Specification of Letters Patent.   Patented May 31, 1921.

Application filed July 2, 1919. Serial No. 308,253.

*To all whom it may concern:*

Be it known that I, HANS P. JENSEN-BEÄRLUNDD, a citizen of Denmark, residing at Lisbon, Portugal, have invented certain new and useful Improvements in Automatic Clutches, of which the following is a specification.

This invention relates to improvements in power transmitting devices designed to couple a power developing machine with a power consuming device and although the invention is particularly adapted for application to the propeller shafts of ships it is to be understood that it is not necessarily limited to such use.

The invention has for its object to interpose a clutch and operating device therefor between the source of power and the propeller whereby when the speed of the latter exceeds that of the engine the propeller is automatically disconnected therefrom and permitted to revolve independently thereof as such speed which it possesses when uncoupled.

Another object is the provision of a device of this character particularly adapted for application to sailing vessels having an auxiliary propelling means in the form of an engine and screw propeller, the latter when the engine is not in operation, being permitted to revolve with relation to the engine shaft so as not to unnecessarily retard the movement of the vessel.

With these and other objects in view which will appear as the description proceeds the invention comprises the novel features of construction, combination and elements and arrangements of parts which will be more fully described in the following specification as set forth with particularity in the claims appended hereto.

Figure 1 represents a fragmentary longitudinal sectional view through the stern of a vessel illustrating the invention applied to use.

Fig. 2 represents an enlarged longitudinal sectional view through the clutch and controlling means therefor, and, Fig. 3 represents a vertical transverse sectional view through the propeller and shaft illustrating the clutch controlling means in detail.

Referring to the drawings in detail, wherein similar reference numerals designate corresponding parts throughout the several views the numeral 5 indicates a fragment of the hull of a vessel provided with a preferred type of thrust bearing 6 in which is journaled the rear propeller shaft section 7 carrying the propeller 8 by which the ship is propelled through the water.

The propeller shaft consists of three sections, the rear section 7, the intermediate section 9 and the front section 10 the latter being preferably connected directly with the engine 11 or other source of power by which the propeller is operated.

The front terminal of the rear shaft section 7 is formed with a circular flange 12 carrying bolts 13 by which a circular hollow casing 14 is secured thereto and the casing is provided internally with transverse ribs received within recesses formed in a series of spaced friction clutch disks 15 which are separated by a series of correspondingly spaced disks 16 carried by a hub 17 bolted or otherwise rigidly secured as at 18 to a flange 19 at the rear terminal of the intermediate shaft section 9. The releasing movement of the clutch members 14 and 17 is effected during rearward movement of the intermediate section 9.

The front terminal 21 of the intermediate shaft section 9 is externally threaded and is fitted in an internally threaded member 22 carried by the rear terminal of the front section 10 and independent rotary movement causes the shaft sections 9 and 10 to either be moved together or separated, according to the direction in which the shafts are rotated or the pitch of the threads thus releasing and clutching the clutch parts 14 and 17. The pitch of the screw threads 21 is such that when the clutch disks 15 and 16 are disengaged and power is applied to the shaft 10, so as to cause the propeller to revolve in a direction to propel the ship forwardly, the resistance, as of the load, offered to the rotary movement of the rear shaft section 7 and intermediate shaft section 9 against rotary movement causes the intermediate shaft section to be moved forwardly by the advance of the externally threaded inner member 21 within the threaded portion of the shaft 10. During advancement of the intermediate shaft section 9 the clutch disks are brought together thereby establishing a driving connection between the intermediate and rear shaft sections and effectively and positively driving the propeller 8. However, when the resistance to the rotary movement of the propeller and rear shaft section is materially decreased, as by lifting the propeller clear of the water, the automatic governor of the engine 11 immediately effects a reduction in speed of the latter by automatic control of the fuel, and the propeller, revolving at a greater speed than the engine shaft section 10, causes a retrograde movement of the screw threads 21 producing a rearward movement of the intermediate shaft section 9 and consequent disengagement of the clutch disks 15 and 16. When the propeller again enters the water obviously the resistance to its rotary movement is increased to normal and its rotary movement is either entirely stopped or the speed of the movement materially decreased. The comparatively slight resistance produced between the clutch disks 15 and 16 when the latter are disengaged is sufficient to cause a retardation of the speed of the intermediate shaft section 9 coincident with the reduction of speed of the rear shaft section 7 and consequently the action of the screw threads 21 incident to the slight relative movement of the shaft sections 9 and 10 produces a gradual forward movement of the intermediate section 9 gradually engaging the clutch disks 15 and 16 and finally establishing a positive driving connection from the engine 11 to the propeller 8 through the shaft sections 9 and 10, clutch and rear shaft section 7.

When the engine is reversed, the screw threads cause a rearward movement of the intermediate shaft 9 until a new driving connection between the opposite faces of the disks is established.

In order to further increase resistance to the rotary movement of the intermediate shaft section 9, when the sections 7 and 9 are released so as to produce the desired forward movement of the intermediate shaft section by advancement of the threaded terminal of the latter in the rear terminal of the shaft section 10, a supplementary lever 23 is pivotally supported at 24 in the hull or body 5 of the ship and is curved adjacent its lower terminal as at 25 to receive a collar 26 rigidly secured upon the shaft section 9 and having a substantially V-shaped groove therein. A strap 27 is pivotally connected at its lower end with the pivot pin 24 and is connected at its upper terminal by a contractile spring 28 with the medial portion of the lever 23. A split ring consisting of substantially semi-circular and relatively movable sections 29 is formed internally in conformity to the external contour of the collar 26 and is connected by laterally projecting pins 30 with the portions of the members 23 and 27 whereby oscillatory movement of the lever is transmitted to the ring 29 in order to move the latter into effectual engagement with one of the inclined side walls of the groove of the collar 26 and thereby brake the movement of the intermediate shaft section 9. A preferred type of locking device such as designated by the numeral 31 in Fig. 1 is preferably associated with the lever 33 whereby the latter may be conveniently locked in adjusted position and by proper manipulation of the lever any desired degree of resistance to the movement of the shaft 9 may be produced so as to retain the latter against rotary movement with relation to the engine shaft section 10 and effect advancement or forward projection of the intermediate section 9 through the medium of the screw threads 31.

What I claim is:

1. In combination, drive, driven and intermediate shaft sections, a clutch connecting the intermediate and driven shaft sections, and means responsive to independent rotary movement of the drive and intermediate shafts to control the clutch.

2. In combination, drive, driven and intermediate shaft sections, a clutch connecting the intermediate and driven shaft sections, and means responsive to relative rotary movement of the drive and intermediate shaft sections to produce axial movement of the intermediate section and automatic control of the clutch.

3. In combination, drive, driven and intermediate shaft sections, a clutch connecting the intermediate and driven shaft sections, means connecting the intermediate and drive shaft sections responsive to variations of the relative speed of the sections to automatically control the clutch, and adjustable means for varying the resistance to the rotary movement of the intermediate section, whereby to vary the responsive action of the shaft section.

4. In combination, drive, driven and intermediate shaft sections, a clutch connecting the intermediate and driven shaft sections, means connecting the intermediate and drive shaft sections responsive to variations of the relative speed of said sections for automatically controlling the clutch, and manually controlled means capable of varying the resistance to the rotary movement of the intermediate shaft section, whereby to vary the speed responsive action of the shaft sections.

5. In combination, drive, driven and intermediate shaft sections, a multiple disk clutch connecting the intermediate and driven shaft sections, and means responsive to independent rotary movement of the drive and intermediate shafts to control the clutch.

6. In combination, drive, driven and intermediate shaft sections, a clutch connecting the intermediate and driven shaft sections, and means responsive to independent rotary movement of the drive and intermediate shafts in either direction to control the clutch.

7. In combination, drive, driven and intermediate shaft sections, a clutch connecting the intermediate and driven shaft sections, and a screw threaded connection between the drive and intermediate shaft sections responsive to independent rotary movement of said shaft sections to automatically control the action of the clutch.

8. In combination, drive, driven and intermediate shaft sections, a multiple disk clutch connecting the intermediate and driven shaft sections, and a screwthreaded connection between the drive and intermediate shafts responsive to independent rotary movement of the last mentioned shaft sections in either direction to automatically control the clutch.

In testimony whereof, I affix my signature hereto.

HANS P. JENSEN-BEÄRLUNDD.